United States Patent
Yu et al.

(10) Patent No.: US 11,629,217 B2
(45) Date of Patent: Apr. 18, 2023

(54) VEGETABLE OIL-MODIFIED, HYDROPHOBIC POLYURETHANE DISPERSIONS

(71) Applicant: Rust-Oleum Corporation, Vernon Hills, IL (US)

(72) Inventors: Wumin Yu, Kenosha, WI (US); Zhigang Chen, Pleasant Prairie, WI (US)

(73) Assignee: RUST-OLEUM CORPORATION, Vernon Hills, IL (US)

( * ) Notice: Subject to any disclaimer, the term of this patent is extended or adjusted under 35 U.S.C. 154(b) by 0 days.

(21) Appl. No.: 14/656,097

(22) Filed: Mar. 12, 2015

(65) Prior Publication Data

US 2016/0009852 A1    Jan. 14, 2016

Related U.S. Application Data

(60) Provisional application No. 61/952,091, filed on Mar. 12, 2014.

(51) Int. Cl.
*C09D 175/04* (2006.01)
*C08G 18/66* (2006.01)
(Continued)

(52) U.S. Cl.
CPC ....... *C08G 18/755* (2013.01); *C08G 18/0823* (2013.01); *C08G 18/289* (2013.01);
(Continued)

(58) Field of Classification Search
CPC .............. C08G 18/755; C08G 18/0823; C08G 18/289; C08G 18/36; C08G 18/4018;
(Continued)

(56) References Cited

U.S. PATENT DOCUMENTS 3,388,999 A   6/1968  Kuhrt et al.
4,704,446 A  11/1987  Goel
(Continued)

FOREIGN PATENT DOCUMENTS

JP    2005306893 A  * 11/2005  .............. C09K 3/10
WO   WO 2004/096744    11/2004
(Continued)

OTHER PUBLICATIONS

JP-2005306893-A_Nov. 2005_English Translation.*
(Continued)

*Primary Examiner* — Michael L Leonard
(74) *Attorney, Agent, or Firm* — McDonnell Boehnen Hulbert & Berghoff LLP

(57) ABSTRACT

Aqueous hydrophobic polyurethane dispersions are made from urethane prepolymers derived from reacting constituents including at least one polyisocyanate, vegetable oil based saturated monoglycerides, non-isocyanate based urethane polyols prepared from polyamines and cyclic carbonates, at least one long-chain polymeric polyol or long-chain polyol from biorenewable resources, polyols with hydrophilic groups, optional polydimethysiloxane based polyols with hydroxyl functional groups terminated in one end and alkyl groups terminated in another end.

36 Claims, 3 Drawing Sheets

(51) Int. Cl.
 C08G 18/08 (2006.01)
 C08G 18/48 (2006.01)
 C08G 18/75 (2006.01)
 C08G 18/50 (2006.01)
 C08G 18/42 (2006.01)
 C08G 18/28 (2006.01)
 C08G 18/40 (2006.01)
 C08G 18/36 (2006.01)
 C08G 71/04 (2006.01)
 C08G 18/61 (2006.01)

(52) U.S. Cl.
 CPC ......... *C08G 18/36* (2013.01); *C08G 18/4018* (2013.01); *C08G 18/4277* (2013.01); *C08G 18/482* (2013.01); *C08G 18/4854* (2013.01); *C08G 18/5024* (2013.01); *C08G 18/5045* (2013.01); *C08G 18/61* (2013.01); *C08G 18/6662* (2013.01); *C08G 18/6696* (2013.01); *C08G 71/04* (2013.01); *C09D 175/04* (2013.01)

(58) Field of Classification Search
 CPC .............. C08G 18/4277; C08G 18/482; C08G 18/4854; C08G 48/5024; C08G 18/5045; C08G 18/61; C08G 18/6662; C08G 18/6696; C08G 71/04; C08G 18/5024; C09D 175/04
 See application file for complete search history.

(56) References Cited

U.S. PATENT DOCUMENTS

| | | | |
|---|---|---|---|
| 4,959,499 A | 9/1990 | Harris | |
| 6,433,121 B1 | 8/2002 | Petrovic et al. | |
| 6,524,978 B1 | 2/2003 | Moore | |
| 6,710,120 B2 | 3/2004 | Gertzmann et al. | |
| 7,045,577 B2 | 5/2006 | Wilkes et al. | |
| 7,989,553 B2 | 8/2011 | Birukov et al. | |
| 8,828,269 B1 | 9/2014 | Garrett et al. | |
| 2002/0028875 A1* | 3/2002 | Anderle | A61K 8/87 524/591 |
| 2004/0254292 A1* | 12/2004 | Williams | C08F 283/006 524/589 |
| 2006/0235100 A1 | 10/2006 | Kaushiva et al. | |
| 2008/0107695 A1* | 5/2008 | Fleissman | A61K 8/895 424/401 |
| 2011/0136976 A1 | 6/2011 | Nakamura et al. | |
| 2011/0269978 A1* | 11/2011 | Garbark | C11C 3/003 554/37 |
| 2012/0214938 A1 | 8/2012 | Mannari | |
| 2013/0041072 A1* | 2/2013 | Sommer | C08G 18/0823 523/415 |
| 2014/0186621 A1 | 7/2014 | Popa et al. | |

FOREIGN PATENT DOCUMENTS

| | | |
|---|---|---|
| WO | WO 2006/047746 | 5/2006 |
| WO | WO 2011/047369 | 4/2011 |
| WO | WO2012/146023 | 11/2012 |

OTHER PUBLICATIONS

Guo, Andrew, et al. "Polyols and Polyurethanes from Hydroformylation of Soybean Oil", J. Polymers and Environment Jun. 2002, vol. 10, pp. 49-52.
Petrovic, Zoran et al., "Polyurethane networks from Polyols Obtained by Hydroformylation of Soilbean Oil", Polymer International 2008, 57, pp. 275-281.
Petrovic, Zoran et al., "Structure and Properties of Polyurethanes Prepared from Triglyceride Polyols by Ozonolysis", Biomacromolecules 2005, 6, pp. 713-719.
LLigadas, G., "Synthesis and Characterization of Polyurethanes from Epoxidized Methyl Oleate Based Polyether Polyols as Renewable Resources", Journal of Polymer Science, Part A: Polymer Chemistry, vol. 44, 2006, pp. 634-645.
Sun, Lan Juan, et al., "A Novel Direct Synthesis of Polyol from Soybean Oil", Chinese Chemical Letters, 23 (2012) pp. 919-922.
Hoydonckx, Hans E., "Esterification and Transesterification of Renewable Chemicals", Topics in Catalysis, vol. 27, Nos. 1-4, Feb. 2004, pp. 83-96.
Gunduz, Gungor, et al., "Oil Modified and Waterborne Polyurethane Resin", Journal of Coating Technology, vol. 74, No. 931, Aug. 2002, pp. 59-62.
Deka, Harekrishna et al., "Bio-based Hyperbranched Polyurethanes for Surface Coating Applications", Progress in Organic Coatings, 66 (2009), pp. 192-198.
Thakur, Suman, et al., "Caster Oil-Based Hyperbranched Polyurethanes as Advanced Surface Coating Materials", Progress in Organic Coatings, 76 (2013) pp. 157-164.
Gite, V.V., "Synthesis and Characterisation of Polyurethane Coatings Based on Trimer of Isophorone Diisocyanate (IPDI) and Monoglycerides of Oils", Surface Coatings International Part B: Coatings Transactions Jun. 2006, vol. 89, pp. 117-122.
Gite, V.V., "Renewable Source-Based Polyurethane Coatings by Using Monoglycerides of Vegetable Oils and its Modification by Nano TiO2", Pigment and Resin Technology, (2013) 42/6, pp. 353-361.
Rajput, Sandip, et al., "Biobased Dimer Fatty Acid Containing Two Pack Polyurethane for Wood Finished Coatings", Progress in Organic Coatings, 77 (2014) pp. 38-46.
Figovsky, Oleg, et al., "Advances in the Field of Nonisocyanate Polyurethanes Based on Cyclic Carbonates", Chemistry and Chemical Technology, vol. 7, No. 1, (2013) pp. 79-87.

* cited by examiner

VEGETABLE OIL-MODIFIED, HYDROPHOBIC POLYURETHANE DISPERSIONS

This application claims priority to U.S. Provisional Patent Application Ser. No. 61/952,091, filed Mar. 12, 2014 for "Polyurethane Dispersions Containing Non-Isocyanate Based Urethane Polyols" the specification of which is incorporated herein by reference.

BACKGROUND OF THE INVENTION (1) Field of the Invention

This invention concerns aqueous hydrophobic polyurethane dispersions made from urethane prepolymers derived from reacting constituents including (A) at least one polyisocyanate, (B) vegetable oil based saturated monoglycerides, (C) non-isocyanate based urethane polyols; (D) at least one long-chain polymeric polyol or long-chain polyol from biorenewable resources, (E) polyols with hydrophilic groups; and (F) optional polydimethysiloxane (PDMS) based polyols.

(2) Description of the Art

Polymer materials containing urethane structure possess superior properties including excellent abrasion resistance, heat and solvent resistance, good adhesion and toughness and are widely used in applications such as coatings, adhesives and composites. Water-based polyurethane dispersions (PUDs) are attracting great attention due to environmental and health legislation that encourage the use of water-based products over their more traditional solvent-based counterparts. In addition, the performance of water-based products has improved over recent years and is now comparable to, if not better, than that of solvent-based products. The market share of PUDs has increased significantly over these years and has only been hindered by their relatively high cost.

Conventional PUDs are based on petroleum-based diisocyanates and polymeric polyols. Due to the concern of future depletion of petroleum and its fluctuating price, as well as the desire to move toward more environmentally friendly and sustainable "green" feedstocks. In recent years, vegetable oil modified PUDs have attracted increasing attention. Vegetable oils such as soybean oil are one of the cheapest and most abundant biorenewable resources available. A vegetable oil molecule is a triglyceride with three fatty acid chains jointed by a glycerol center. For most vegetable oils, there is no hydroxyl functionality, but unsaturated C=C double bonds are present in the fatty acid chains. Therefore, further chemical modification is required to covert vegetable oils into building blocks for PUDs. The modifications typically require multistep processes that increase the cost of the modified vegetable oil.

Initial application of vegetable oils in PUDs takes advantage of the oxidative self-crosslinking ability of unsaturated fatty acid chains by first converting vegetable oils to oil-esters by alcoholysis to incorporate hydroxyl functions. This type of vegetable oil modified PUDs is widely used in industry for many applications. Over the last decades, efforts have been made trying to develop vegetable oil-based polyols with high bio-content by chemically modifying the unsaturated sites to introduce hydroxyl functionalities. These vegetable oil-based polyols are then used to replace petroleum based polyols in polyurethane synthesis. Some of the common modification approaches include hydroformylation followed by hydrogenation, ozonolysis and ring-opening of epoxidized derivatives. Vegetable oil based polyols prepared from these methods could involve multi-step process, resulting in higher cost. Even though high bio-content vegetable oil modified PUDs prepared from these soy polyols have been reported, it is still a challenge to balance materials properties, bio-content and particularly material cost for commercial success.

Vegetable oil based monoglycerides (MGs) are another kind of polyol derived from the reaction of triglycerides with glycerol catalyzed by acids, bases or enzymes and then purifying with molecular distillation. High purity MGs based on different kinds of vegetable oils are also commercially available. The chain length between hydroxyls groups in a MG is very short. It is difficult to obtain high molecular weight polymers with good mechanical properties instead of rigid and brittle polymers by simply reacting MGs with diisocyanates. Therefore MGs are usually reacted with diacids (for example, adipic acid), anhydrides (for example, phthalic anhydride) or diamines (for example, hexamethylenediamine) to produce long chain polyester or polyamide diols for polyurethane applications. There are reports on using MGs to replace all or part of the petroleum-based polyols directly in polyurethane synthesis. Most research has focused on using unsaturated MGs to prepare air-curable solvent-borne and water-borne polyurethanes.

Due to the existence of hydrophilic and or ionic groups in conventional PUDs, coating films made from conventional PUDs suffer from poor water resistance and hydrolytic instability. A common way to improve the water resistance and hydrolytic stability of PUDs is to incorporate silicon or fluorine containing hydrophobic moieties into the chain backbone, which usually leads to higher cost. It has been reported that the non-polar hydrocarbon chains from the dangling fatty acid chains in soy modified polyurethanes can limit water diffusion and thus slow down hydrolysis. Due to their low surface energy, the dangling non-polar hydrocarbon chains have a tendency to migrate to the air/film surface after applications and form a hydrophobic barrier to repel water.

Currently, isocyanates are reacted with polyols to produce polyurethane materials. Isocyanates are toxic. The allergic and sensitization issues when handling isocyanates are well known. Isocyanates are also relatively expensive, especially for the high performance aliphatic isocyanates. Non-isocyanate process, especially process based on cyclic carbonates and amines, are drawing attention recently in order to reduce or even eliminate the use of toxic isocyanates in polyurethane production. The formation of urethane groups via isocyanate process and non-isocyanate process is shown below.

Isocyanate route:

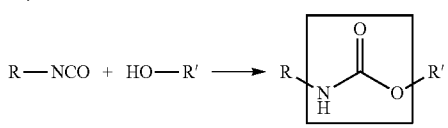

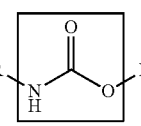

Urethane group

Non-isocyanate route:

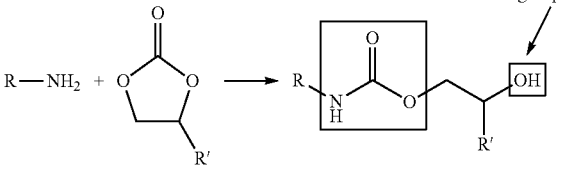

Hydroxyl group

This non-isocyanate process generates not only urethane bonds but also hydroxyl groups, which can be further chemically modified. When polycyclic carbonates and polyamines are used, isocyanate-free polyurethane production process is possible. Polycyclic carbonates can also be derived from vegetable oils. For example, U.S. Pat. No. 7,045,577 discloses a process of making nonisocyanate polyurethane (NIPU) from carbonated vegetable oils prepared by reacting carbon dioxide with epoxidized vegetable oils. NIPU obtained by the reaction between the polycyclic carbonate oligomers and polyamides with primary amino groups contain β-hydroxyurethane groups. Due to plurality of hydroxyl groups, polyhydroxyurethanes made from polycyclic carbonates and polyamines show poor water resistance. The reaction between polycyclic carbonates and polyamines is slower than the reaction of isocyanates with hydroxyl groups. There is also lack of commercially available polycyclic carbonates. These problems limit the commercialization and applications of polyurethanes generated from polycyclic carbonates and polyamines. However, polyamines and monocyclic carbonates are commercially available and relatively low-cost. Urethane polyols derived from the reaction of polyamines with monocyclic carbonates have been reported to be used as reactive components to produce hybrid materials.

There is a need, therefore for PUDs that contain both vegetable oil-based biorenewable materials and a non-isocyanate chemistry to reduce or eliminate the use of petroleum-based feedstocks and toxic isocyanates. There is further a need for PUD that can be manufactured without additional complexity and cost and without sacrificing the resultant polyurethane properties.

SUMMARY OF THE INVENTION

One aspect of this invention is to utilize the inherent hydrophobic and water repellent nature of the saturated or hydrogenated fatty acid chains of vegetable oils to develop highly hydrophobic soy PUDs.

Another aspect of this invention is the preparation of urethane polyols from commercially available, low-cost polyamines and monocyclic carbonates based on non-isocyanate chemistry and incorporating them into our novel vegetable oil based PUDs to achieve essentially the same density of urethane groups while reducing the use of isocyanate monomers.

Yet another aspect this invention is a method of preparing aqueous polyurethane dispersions (PUDs) that can be used to produce coatings with high hydrophobicity, excellent water repellency and early water resistance, fast drying, optionally very low coefficient of friction, and good mechanical properties. The hydrophobic polyurethane dispersions can be made from polyurethane prepolymers produced by the reaction of polyisocyanates and a mixture of polyols. The polyol mixtures include vegetable oil-based saturated monoglycerides, non-isocyanate based urethane polyols prepared from the reaction of polyamines and cyclic carbonates, long-chain polymeric polyols (for example polyester, polyester and/or polycarbonate polyols) or long-chain polyols from biorenewable resources, polyols with hydrophilic groups and optionally polydimethylsiloxane polyols with all hydroxyl functional groups at one chain end.

A further aspect of this invention is a vegetable oil modified polyurethane dispersion comprising a polyurethane prepolymer that is the product of the admixture of: at least one polyisocyanate; at least one saturated monoglyceride (SMG) from a vegetable oil; at least one long-chain polymeric polyol; at least one non-isocyanate based urethane polyol prepared from a polyamine and a cyclic carbonate; optionally one polydimethylsiloxane polyol with hydroxyl functional groups terminated in one end and alkyl groups terminated in another end; and at least one polyol with hydrophilic and/or ionic groups.

Yet another aspect of this invention are coating films including said PUDs. Such coating films can exhibit excellent surface properties that are believed to be caused by the surface segregation and ordering of the dangling saturated fatty acid side chains on the coating films/air interfaces. The coating films derived from the PUDs embodiments of this invention have good mechanical properties due to the plurality of urethane groups in the polymers with the use of non-isocyanate based urethane polyols.

DETAILED DESCRIPTION

One aspect of this invention are aqueous hydrophobic polyurethane dispersions are made from urethane prepolymers derived from reacting constituents including (A) at least one polyisocyanate, (B) vegetable oil based saturated monoglycerides, (C) non-isocyanate based urethane polyols prepared from polyamines and cyclic carbonates, (D) at least one long-chain polymeric polyol or long-chain polyol from biorenewable resources, (E) polyols with hydrophilic groups, (F) optional polydimethysiloxane (PDMS) based polyols with hydroxyl functional groups terminated in one end and alkyl groups terminated in another end. The prepolymers are then neutralized, dispersed in water and chain extended to form hydrophobic polyurethane dispersions. The coating films from the said hydrophobic polyurethane dispersions exhibit very high hydrophobicity, excellent water repellency and early water resistance, fast drying ability and optionally very low coefficient of friction, as well as good mechanical properties.

PUDs are widely used in protective coatings for a variety of substrates such as wood, metal and concrete due to their superior mechanical properties. The performance of a protective coating not only relies on their mechanical properties, but is also determined by their surface properties, e.g., wettability, abrasion and scratch resistance, friction, permeability, stain resistance, dirt pick up resistance, etc. Advanced applications such as water repellent, self-cleaning, low-friction, anti-fouling or antibacterial can be achieved with these special surface characteristics, which are generally considered to be controlled by the outmost 5-10 Å surface layer.

Figure 1:
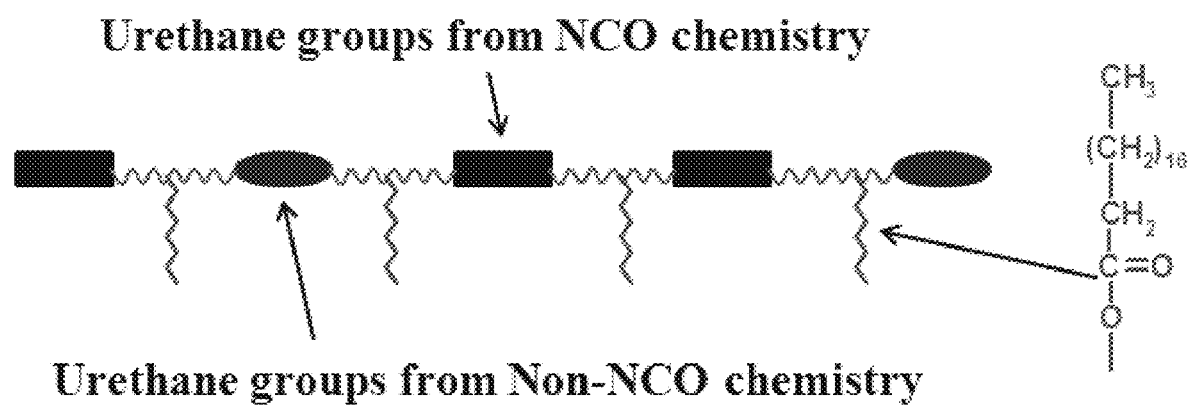
FIG. 1 is a schematic structure of soy PUDs of this invention.

One approach to engineering the surface for special properties takes advantage of the surface segregation phenomenon. According to thermodynamics, the low energy components of a coating have a tendency to segregate to the air-coating interface to minimize the surface energy of the coating system. In this invention, we utilized the surface segregation tendency of saturated fatty acids in MGs from vegetable oils to prepare highly hydrophobic soy PUDs. Saturated fatty acids were introduced to the PUDs as dangling side chains. Polymer chain ends are well-known to possess high free volume, which also promotes the surface segregation of the chain ends due to the entropy effect. Therefore, with a comb-like structure as shown in FIG. 1, the dangling saturated fatty acid side chains are expected to be preferentially segregated to surface after applications. Urethane bond concentration in a polyurethane-based material is critical in determining the properties of the material, since most of the unique, premium properties of polyurethanes come from the hydrogen bonding between the urethane bonds. In this invention, urethane polyols based on non-isocyanate chemistry were also incorporated into the polyurethane backbone to increase the density of urethane groups and achieve excellent mechanical properties without increasing the use of isocyanates.

Figure 2:
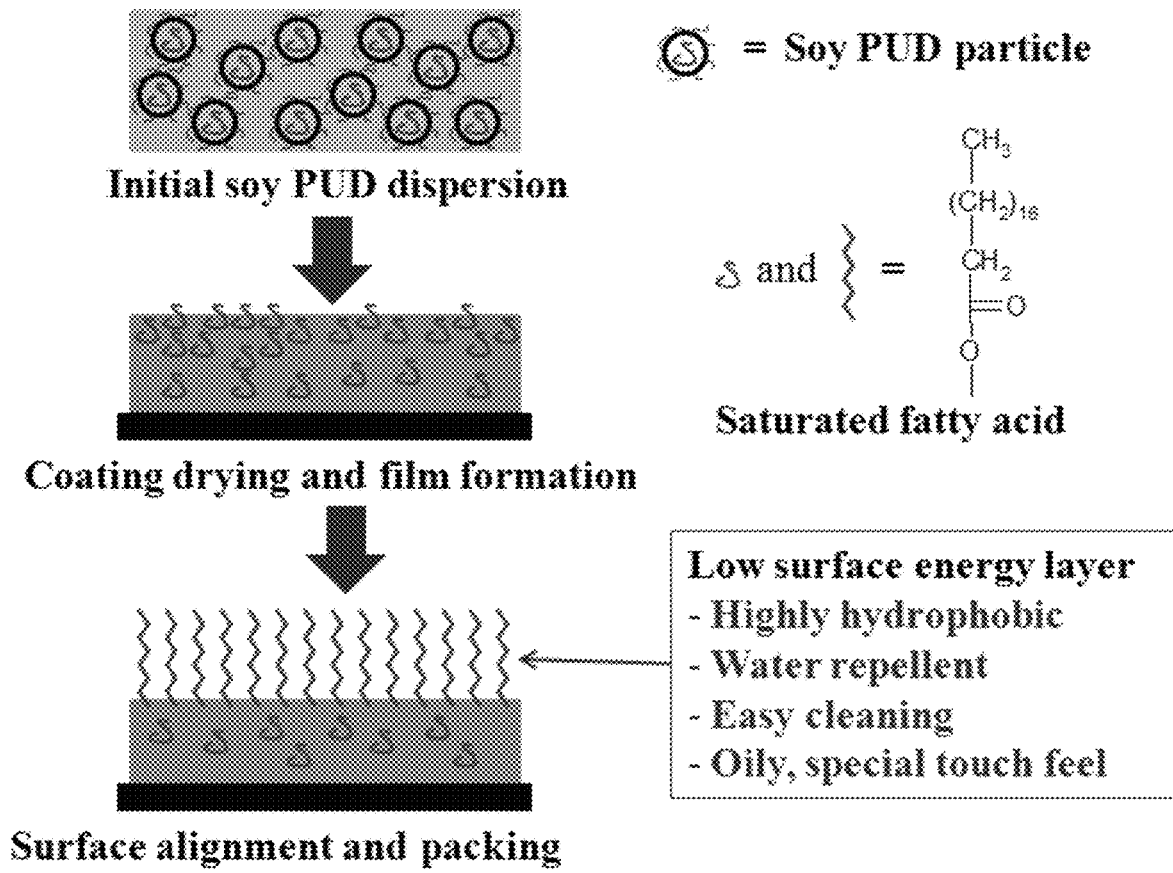
FIG. 2 is a schematic of the speculated mechanism of film formation followed by surface segregation of soy PUDs of this invention.

A schematic diagram of the speculated mechanism of film formation followed by surface segregation of the novel vegetable oil modified PUDs is shown in FIG. 2. In the initial dispersion state, the saturated fatty acid side chains are buried inside the particles, which are stabilized in water by their internal hydrophilic pendent groups. Once the vegetable oil modified PUD coating is applied to a substrate, the saturated fatty acid side chains start to segregate toward the surface during the drying process and form a fatty acid rich surface layer. With regard to reaching minimum surface free energy for hydrocarbons, surfaces comprising close-packed, oriented, methyl groups had the lowest value of surface tension and hence the highest water contact angle. In contrast, poor side chain alignment and the exposure of the polymer backbone is believed to lead to higher surface tension. Therefore, the fatty acid chains need to undergo further alignment and packing on the surface to achieve a surface layer with very low surface free energy, which is expected to bring the surface a series of new properties such as high hydrophobicity, excellent water repellency, easy-cleaning and oily, special touch feel.

In another aspect, this invention includes high performance vegetable oil modified polyurethane dispersions made from polyurethane prepolymer including the reaction constituents of:
(A) at least one polyisocyante;
(B) at least one saturated monoglyceride (SMG) from a vegetable oil;
(C) at least one long-chain polymeric polyol or long-chain polyol derived from a biorenewable resource;
(D) optionally at least one non-isocyanate based urethane polyol prepared from a polyamine or amino alcohol and a cyclic carbonate;
(E) optionally, at least one polydimethylsiloxane polyol with hydroxyl functional groups terminated in one end and alkyl groups terminated in another end;
(F) at least one polyol with hydrophilic and/or ionic groups.

Polyisocyanates are organic isocyanates having two or more isocyanate groups, including aliphatic, cycloaliphatic, araliphatic and aromatic polyisocyanates. Specific examples of suitable polyisocyanates include but are not limited to isophorone diisocyanate, 2,6- and 2,4-tolylene diisocyanate, 4,4'-methylene diphenyl diisocyanate, meta-tetramethylxylene diisocyanate, 1,4-cyclohexane diisocyanate, xylene diisocyanate, 1,5-naphthylene diisocyanate and the like. The amount of the polyisocyanates in the polyurethane prepolymer is generally from 5 to 60% by weight, more preferably from 20 to 45% by weight. Unless indicated otherwise, these and all other listed weight percent ranges refer to the percent by weight of all the monomers—on a solvent free basis.

"Saturated monoglyceride" in this invention refers to "hydrogenated monoglyceride" with iodine value which is preferably less than 3 and more preferably less than 1. The saturated monoglycerides can be derived from plant-based oils including but not limited to soybean oil, canola oil, tall oil, safflower oil, linseed oil, castor oil, corn oil, sunflower oil, olive oil, sesame oil, cottonseed oil, palm-based oils, rapeseed oil, tung oil, peanut oil, jatropha oil, and combinations. The saturated monoglycerides can also be derived from animal fats. The amount of the saturated monoglycerides in the polyurethane prepolymer is preferably from 5 to 40% by weight, more preferably from 15 to 30% by weight, based on the amount by weight of all the monomers.

Long-chain polymeric polyols refer to polymeric polyols and preferably petroleum-based polymeric polyols having at least two hydroxyl groups per molecule, and preferably having a number average molar mass of from 500 g/mol to 5000 g/mol and more particularly from 1000 g/mol to 3000 g/mol. Such polymeric polyols include polyether polyols, polyester polyols, polycarbonates polyols, acrylic polyols and polybutadiene polyols. Long-chain polyols derived from biorenewable resources refer to polyols prepared partly or entirely form biorenewable resources with a number average molar mass of from 500 g/mol to 5000 g/mol, in particular from 1000 g/mol to 3000 g/mol. The content of long-chain polyols is preferably from 10 to 60% by weight, more preferably from 20 to 40% by weight, based on the amount by weight of all the monomers.

Non-isocyanate based urethane polyols in this invention refer to polyols prepared by the reaction of polyamines or amino alcohols with cyclic carbonates. Examples of polyamines that can be used to synthesize non-isocyanate based urethane polyols include, but not limited to ethylene diamine, 1,3-diaminopropane, hexamethylenediamine, Jeffamine D-230, D-400 and T-403 from Huntsman, Vestamin TMD and IPD from Evonik. Useful amino alcohols may have at least one amino group and at least one hydroxyl group. Suitable amino alcohols include but are not limited to ethanolamine, 3-amino-1-propanol, 1,3-diamino-2-propanol, 2-amino-2-methyl-1-propanol, and mixtures thereof.

Useful cyclic carbonates include those with at least one cyclic carbonate group. Suitable cyclic carbonates include but are not limited to ethylene carbonate, propylene carbonate, glycerin carbonate and mixtures thereof. The content of non-isocyanate based urethane polyols is preferably from 0 to 30% by weight, more preferably from 5 to 15% by weight, based on the amount by weight of all the monomers.

Optionally, polydimethylsiloxane (PDMS) side chains can be introduced into the vegetable oil based PUDs to form a comb-like structure with dangling PDMS/saturated fatty acid hybrid side chains. Polyhydroxyl functional PDMS with hydroxyl groups terminated in one end and alkyl groups terminated in another end can be typical typically used for this purpose, for example, Monodicarbinol terminated PDMS, MCR-C61 and MCR-C62, from Gelest. The amount of PMDS polyols in the is preferably from 0 to 10% by weight, more preferred from 2.5 to 5% by weight, based on the amount by weight of all the monomers.

In order to achieve the water dispersibility of the polyurethanes, it is preferred to include at least one polyol that imparts hydrophilic characteristics to the prepolymer. The hydrophilic groups not only allow the prepolymer to be easily water-dispersible but also facilitate the formation of fine prepolymer droplets and hence a stable polymer dispersion. The hydrophilic groups can be non-ionic or preferably, ionic hydrophilic groups, and more preferably anionic hydrophilic groups. Polyols with non-ionic characteristic are polymer polyols containing oxyethylene units. The polyols may be homopolymers of ethylene oxide, random copolymers of ethylene oxide and another alkylene oxide, or block copolymers of ethylene oxide and another alkylene oxide. Ionic groups include anionic groups such as sulfonate, carboxylate and phosphate group in the form of acids or their alkali metal or ammonium salts, and cationic groups such as tertiary amino groups or quaternary ammonium groups. Exemplary polyols containing ionic functionality include but not limited to 2,2-dimethylolpropionic acid (DMPA) and 2,2-dimethylolbutainc acid (DMBA). The content of the said hydrophilic functional polyols is preferably from 2 to 15% by weight, more preferred from 3 to 8% by weight, based on the amount by weight of all the monomers.

In the prepolymer preparation step, the reaction is usually carried out at temperatures of from 50° C. to 140° C., preferably from 70° C. to 100° C., depending on the reactivity of the isocyanate employed, and the presence of a catalyst or not.

Catalysts are optional in the present invention. Suitable catalysts include tertiary amines, and organometallic compounds, like compounds and mixtures thereof. Exemplary catalysts include but not limited to dibutyltin dilaurate (DBTDL), dibutyltin sulfide, stannous octoate, lead octoate, ferric acetylacetonates, bismuth carboxylates, triethylenediamine, like compounds and mixtures thereof. Catalysts are generally added in quantities of 0.005 to 1% by weight, based on the weight of the reaction mixture as a whole.

Organic solvents that are inert toward isocyanate-polyol reaction and compatible with water optionally can be added before or after prepolymer formation to control the viscosity. Suitable solvents include but not limited to dimethylformamide, esters, ethers, ketoesters, ketones, e.g., methyl ethyl ketone and acetone, glycolether-esters, aliphatic and alicyclic hydrocarbon-substituted pyrrolidinones, e.g., N-methyl-2-pyrrolidinone and N-ethylpyrrolidone, hydrogenated furans, aromatic hydrocarbons, and the like, and mixtures thereof. When solvents are employed during the synthesis, it is desirable to remove majority of the solvents from the dispersions by, for example, distillation under reduced pressure. The dispersions preferably have a solvent content of less than 10% by weight and are preferably free of solvents.

Optionally ethylenically unsaturated monomers such as acrylate monomers, styrenic monomers or their mixture can be added to the prepolymer to lower the viscosity. After the prepolymer is dispersed in water, these ethylenically unsaturated monomers in the dispersion can further polymerize in the presence of a free radical initiator to form a hybrid polyurethane dispersion.

The prepolymer produced in this invention normally will be isocyanate-terminated. For this purpose, the molar ratio of isocyanate groups to hydroxyl groups in the prepolymer is typically from 1.05 to 2.5, preferably from 1.1 to 1.7. A hydroxyl-terminated prepolymer can be made if desired. In this case, an access of hydroxyl equivalents over isocyanate is used. If desired, the isocyanate-terminated prepolymer can also be converted to acrylate-terminated prepolymer by the reaction of the isocyanate-terminated prepolymer with at least one hydroxyl functional acrylate monomer. Suitable hydroxyl functional acrylate monomers include but not limited to 2-hydroxyethyl acrylate, 2-hydroxylpropyl acrylate, hydroxypropyl methacrylate and butanediol monoacrylate. The acrylate terminated prepolymer can then be dispersed in water and form a UV curable dispersion in the presence of a photoinitiator.

Several approaches can be used to disperse the prepolymer into water to form the urethane dispersion: (1) the prepolymer is charged to water; (2) water is charged to prepolymer. Normally, neutralizing agents are employed to neutralize the ionic groups in the prepolymer to form an internal ionic emulsifier which facilitates the dispersion of the prepolymer in water and also enhances the stability of the dispersion. For example, to neutralize carboxylic acid groups in the prepolymer, tertiary amines such as trimethylamine, triethylamine and methyldiethylamine can be used. The neutralizing agents are usually employed in a molar ratio with regard to the ionic groups of the prepolymer of about 0.3:1 to 1.3:1, preferably from about 0.5:1 to 1:1. Neutralization can occur before or when the prepolymer is added to water. Moreover, one can use combinations of pre-neutralization of the prepolymer and additional neutralizing agents in the water phase. In the case that prepolymer contains sufficient nonionic (steric) stabilization, neutralization of anionic groups can occur before or after the prepolymer is chain extended.

The isocyanate-terminated prepolymer is usually chain extended by reaction of the isocyanate groups with chain extension agents carrying two or more isocyanate-reactive groups to increase the molecular weight of the final product. Suitable chain extension agents include polyols, alkanolamines, various hydrazines, aminoalcohols and polyamines. Hydrazines and polyamines are preferred because they generally have higher reactivity with isocyanate groups. Examples of useful chain extenders include but are not limited to ethylene diamine, diethylene triamine, triethylenetetraamine, propylene diamine, butylenes diamine, cyclohexylenediamine, ethanolamine, isopropanol amine, diethanol amine, diisopropanol amine, piperazine, 2-methyl piperazine, aminoethylethanolamine, monoethanol amine, and the like. The reaction of the prepolymer with the chain extender can be carried out before, during or after dispersing the prepolymer to water. The amount of chain extender normally ranges from about 0.5 to about 0.95 equivalents based on available isocyanate.

Figure 3:
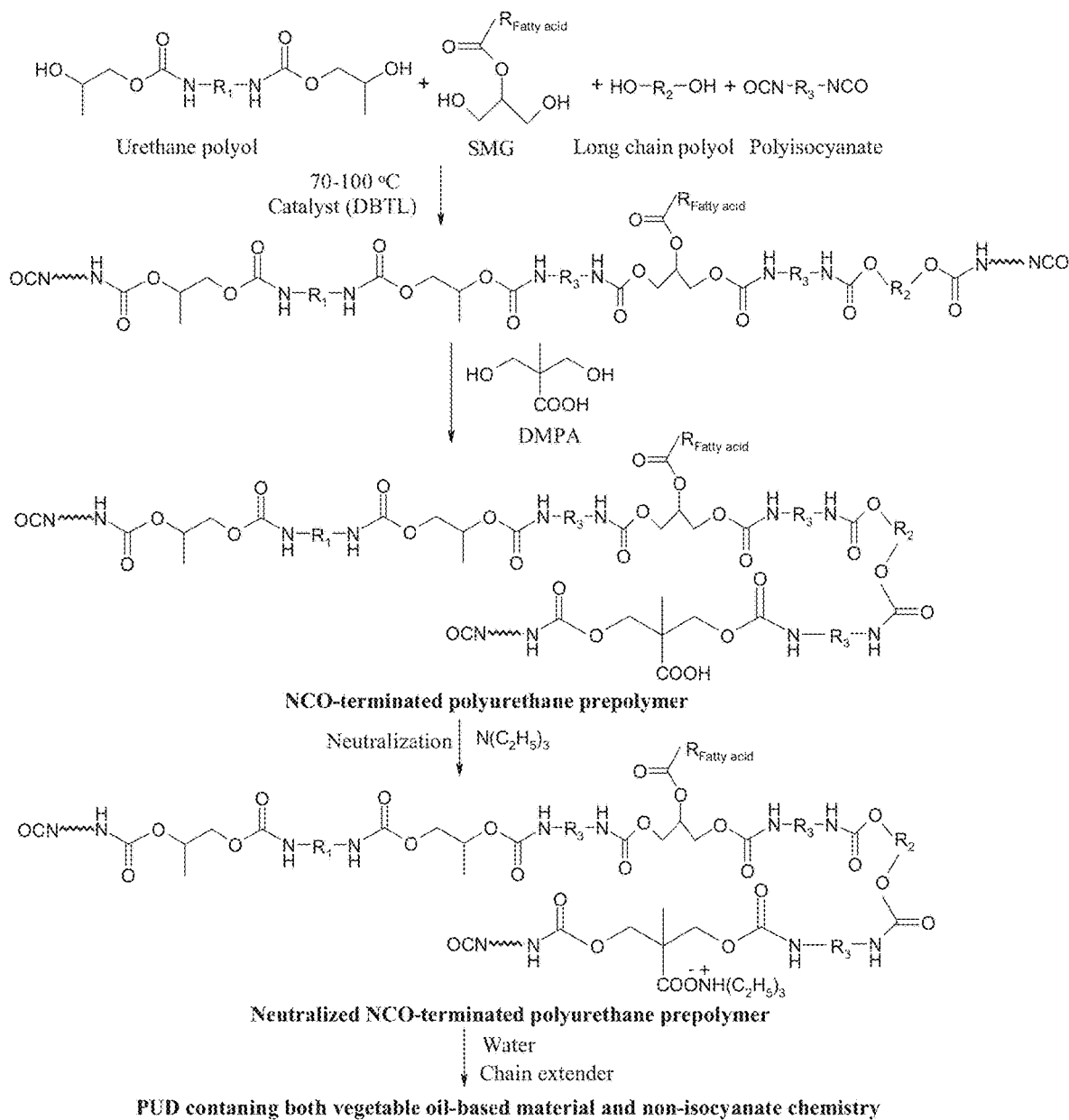
FIG. 3 is an example of a method of synthesizing PUD containing both vegetable oil-based saturated monoglycerides (SMG) and non-isocyanate chemistry.

FIG. 3 shows a synthesis method for preparing a vegetable oil modified anionic polyurethane dispersion that contains both saturated fatty acid side chains and urethane groups based on non-isocyanate chemistry. Various polyols including urethane polyols prepared by the non-isocyanate route, long-chain polyols, carboxyl acid functional polyols and vegetable oil-based SMG first react with polyisocyanates at elevated temperatures to form an isocyanate-terminated polyurethane prepolymer. The carboxyl acid pendent groups in the polyurethane prepolymer is then neutralized with bases such as triethylamine (TEA) to form an internal salt group containing prepolymer, which can be easily dispersed in water. The neutralized polyurethane prepolymer is then dispersed in water under high shear mixing and chain extended with polyamines to form the dispersion. If all the polyols employed are diols, polyurethanes with more linear structure will be produced. As the ratio between high functionality polyols to diols increases, polyurethanes with more branched or cross-linked structure will be produced. Such ratio can be carefully controlled in order not to gel the polyurethane prepolymers in the reaction. The molar ratio of isocyanate groups to hydroxyl groups can be adjusted to produce either hydroxyl or isocyanate terminated polyurethane prepolymers. Long chain polyols act as soft segments to provide flexibility to the polymers. The polymer backbone has dense urethane bonds thus is expected to be rather strong but still flexible, i.e., tough.

Characterization

ASTM methods were used for sample characterization where applicable. The hardness of the coating film was obtained through the König pendulum hardness test (ASTM D 4366-95). The dry time of the coating was recorded using GAROCO electronic dry time recorder. Impact resistance was tested on a universal drop tester (ASTM D-2794-99). Abrasion resistance was tested on Taber Abraser 5150 (1000 cycles, CS-10 wheel, 1000 g load, ASTM 4600-10). Coefficient of friction (COF) was measured using a Gardner ASM 825A digital slip meter. The FTIR spectra of urethane polyols were recorded between 4,000 and 400 cm$^{-1}$ with the IlluminatIR Infrared Microspectroscopy.

Water contact angle measurements were performed with a PocketGoniometer PGX+ (FIBRO System AB). The contact angle values were measured using the static sessile drop method. Results are the average values of five measurements taken at different parts of a coating.

Water repellent efficiency (WRE) of PUD films was tested as follows. Wood sticks (standard 6 inch tongue depressors) were coated with the testing resins and dried for 2 days at room temperature. Both the coated wood sticks uncoated wood sticks (control) were immersed in distilled water for one hour and then taken out. Excess water on wood stick surfaces was wiped up using filter paper. The weight gained due to water absorption in each uncoated wood stick and coated wood stick was recorded. The water repellent efficiency is calculated as $$WRE = \frac{w_2 - w_1}{w_2} \times 100\% \quad (1)$$

where $w_1$ is the average weight gained of five coated wood sticks due to water absorption and $w_2$ is the average weight gained of five uncoated wood sticks. Based on equation (1), higher WRE value corresponds to better water repellent ability of coating.

Early water resistance was tested using water drop spot test method. 3 mil wet film was applied on a Leneta paper using a drawdown bar. After drying at room temperature for 30 min, a water drop was placed on the film surface. Any residual water was then wiped off from the film surface after 30 min and the water contact area of the film was checked for water damage and evaluated on the following scale (4: no effect, 3: slight water mark, 2: blister, wrinkling, and bubble, 1: coating failure).

EXAMPLES

The following examples are provided to illustrate aspects of invention, but are not intended to limit the scope thereof. All parts and percentages are by weight unless otherwise indicated.

CHEMICALS AND ABBREVIATIONS LIST

JEFFAMINE D230: difunctional polyetheramine with an average molecular weight of about 230 from Huntsman
JEFFAMINE T403: trifunctional polyetheramine with an average molecular weight of about 440 from Huntsman
SMG: Saturated monoglyceride derived from soybean oil (Alphdadim 90 SBK from Caravan Ingredients Inc.)
MCR C61: monocarbinol terminated polydimethylsiloxane with a molecular weight of about 1000 from Gelest
MCR C62: monocarbinol terminated polydimethylsiloxane with a molecular weight of about 5000 from Gelest
Terathane 2000: polytetramethylene ether glycol (PTMEG) with a molecular weight of about 2000 from Invista
Capa 2201A: linear polycaprolactone diol with a molecular weight 2000 from Perstorp
IPDI: isophorone diisocyanate
NMP: N-Methyl-2-pyrrolidone
TEA: triethylamine
EDA: ethylenediamine
WC: water contact angle
WRE: water repellent efficiency
COF: coefficient of friction

Synthesis of Urethane Polyols Using Non-Isocyanate Chemistry

Example 1

Synthesis of Urethane Diol D230PC

Urethane diol D230PC was synthesized from propylene carbonate and JEFFAMINE D230 from Huntsman. 350 g (1.522 mol) of D230 and 310.8 g (3.044 mol) of propylene carbonate were added to a 1000 ml 3-neck round bottom flask equipped with a mechanical stirrer, a thermocouple and a nitrogen inlet. The mixture was heated to 120° C. and stirred under nitrogen protection. The conversion of cyclic carbonate groups to urethane groups was monitored using FTIR. The disappearance of the absorption peak at approximately 1800 cm$^{-1}$ indicated the complete conversion of cyclic carbonate groups to urethane groups. The as-synthesized urethane polyols was dried under vacuum at 120° C. for 3 hours to remove any residual water.

Example 2

Synthesis of Urethane Triol T403PC

Urethane triol T403PC was synthesized by the procedure described in Experiment 1. 440 g (1 mol) JEFFAMINE T403 from Huntsman and 306.3 g (3 mol) of propylene carbonate were used.

Synthesis of Vegetable Oil-Based PUDs

Example 3-9

Calculated amount of SMG, D230PC, T403PC, MCR C61, MCR C62 and Terathane 2000 (based on Table 1) were placed in a jacketed glass reactor equipped with a mechanical stirrer, a thermocouple, a condenser and a nitrogen inlet. The reaction was carried out at 85° C. When a homogeneous mixture was reached under mechanical stirring in the reactor, IPDI was charged in the presence of one drop of dibutyltin dilaurate (DBTDL) catalyst. After one hour of reaction, DMPA and NMP mixture was added. The reaction temperature was kept at 85° C. and an appropriate amount of acetone was added to the reactor when necessary to lower the viscosity of the polyurethane prepolymers. When the desired free isocyanate content was reached (isocyanate content was tested according to ASTM D 2572-97), the reaction mixture was cooled down to 50° C. and a calculated amount of neutralization agent triethylamine was added. After 30 min of neutralization, the resulting prepolymers were dispersed in water under high shear. Then chain extender ethylenediamine was added and acetone was stripped off under vacuum at 40-45° C. The solid contents were adjusted to 35~40% wt after the distillation.

TABLE 1

Chemical components of vegetable oil modified PUDs (amount in grams)

| Components | Experiments (Examples) | | | | | | |
|---|---|---|---|---|---|---|---|
| | 3 | 4 | 5 | 6 | 7 | 8 | 9 |
| SMG | 32 | 50 | 40 | 40 | 40 | 40 | 40 |
| D230PC | 0 | 0 | 16 | 16 | 16 | 16 | 16 |
| T403PC | 0 | 0 | 8 | 8 | 8 | 8 | 8 |
| MCR C61 | 0 | 0 | 0 | 5 | 10 | 0 | 0 |
| MCR C62 | 0 | 0 | 0 | 0 | 0 | 5 | 10 |
| Terathane 2000 | 50 | 50 | 40 | 40 | 40 | 40 | 40 |
| DMPA | 7.00 | 8.80 | 9.40 | 9.80 | 10.10 | 9.70 | 10.00 |
| IPDI | 48.55 | 67.19 | 74.14 | 76.44 | 78.53 | 75.07 | 76.01 |
| NMP | 14 | 16 | 16 | 16 | 16 | 16 | 16 |
| Acetone | 130 | 150 | 150 | 150 | 150 | 150 | 150 |
| TEA | 5.28 | 6.64 | 7.09 | 7.39 | 7.62 | 7.32 | 7.54 |
| EDA | 2.73 | 3.77 | 4.16 | 4.29 | 4.41 | 4.22 | 4.27 |
| DI water | 321 | 411 | 438 | 444 | 450 | 440 | 444 |

Example 10

The vegetable oil-modified PUD was synthesized using the similar procedure described in Experiment 3-9 and the same chemical components as Experiment 5 but without NMP. SMG, D230PC, T403PC, Terathane 2000 and DMPA were charged to the reactor and mixed at 85° C. IPDI was added after DMPA had dissolved in the polyol mixture.

Example 11

The vegetable oil-modified PUD was synthesized using the same procedure and chemical components except Terathane 2000 was replaced with Capa 2201A.
Film Properties

TABLE 2

Properties of the vegetable oil-modified PUDs as compared to benchmarking commercial PUDs

| | Vegetable oil modified PUDs from Experiments 3-11 | | | | | | | | | Commercial PUDs | | | |
|---|---|---|---|---|---|---|---|---|---|---|---|---|---|
| | No. 3 | No. 4 | No. 5 | No. 6 | No. 7 | No. 8 | No. 9 | No. 10 | No. 11 | C1 | C2 | C3 | C4 |
| Koenig hardness (s) | 55 | 90 | 151 | 148 | 147 | 137 | 132 | 132 | 125 | 91 | 150 | 155 | 134 |
| Impact (Direct, lb-in) | — | — | 200 | 200 | 200 | 200 | 200 | 200 | 200 | 200 | 200 | 200 | 200 |
| Flexibility (Mandrel) | — | — | Pass | Pass | Pass | Pass | Pass | Pass | Pass | Pass | Pass | Pass | Pass |
| Taber (mg loss) | 67.7 | 69.2 | 24.5 | 49.3 | 60.0 | 49 | 63.2 | 42.5 | 48.2 | 8.4 | 22.8 | 28.7 | 28.4 |
| COF | 1.06 | 1.04 | 1.18 | 0.45 | 0.42 | 0.28 | <0.1 | 0.98 | 0.95 | 0.96 | 1.22 | 1.28 | 0.38 |
| WC (deg) (7 days) | 104 | 103 | 103 | 104 | 104 | 103 | 103 | 103 | 103 | 61 | 64 | 74 | 84 |
| WRE (%) (2 days) | 98 | 98 | 99 | 93 | 99 | 97 | 99 | 94 | 98 | −6 | 28 | −1 | 59 |

TABLE 3

Dry time comparison

| PUD samples | No. 5 | C1 | C2 | C4 |
|---|---|---|---|---|
| Dry time (min) | 9 | 20 | 17 | 17 |

When compared with the commercial PUDs, the novel vegetable oil modified PUDs from this invention also dried faster, as illustrated in Table 3. The fast drying ability of the novel vegetable oil modified PUDs could be attributed to the conversion of the low energy fatty acid chains form inside the PUD particles to outside of the particles due to surface segregation, which in return reduced the interaction force between the water molecules and the particles, allowing To demonstrate the excellent performance of the novel vegetable oil modified PUDs in this invention, four petroleum-based commercial PUDs (C1, C2, C3 and C4) with good mechanical properties and solid contents ranging from 35 to 40% wt were chosen for benchmarking. C1, C2 and C3 are aliphatic polyester based. C4 is a silicone-modified PUD that is claimed to be outstanding in water resistance and exhibiting very low COF. Table 2 shows that coating films from the novel vegetable oil modified PUDs are very highly hydrophobic and have excellent water repellent efficiency while their mechanical properties such as hardness, impact resistance, flexibility and taber abrasion are comparable to those from the benchmarking commercial PUDs. With incorporating a small amount of PDMS side chains, the COF values of the coating films vegetable oil modified PUDs dropped dramatically.

faster movement of the water molecules to the surface for evaporation. The fast drying ability of the novel soy PUDs could reduce the return-to-service time of coating systems formulated with these soy PUDs.

Exterior coatings might be subjected to moisture or rain shortly after application in compromised weather conditions. The ability to withstand water damage at the very early stage of application or early water resistance is a highly desired property for exterior coatings. In this work, we tested the early water resistance of a PUD sample by placing a droplet on the surface of the PUD coating after 30 min of drying and then checked for the water mark after the coating surface was in contact with water for 30 min. All the commercial benchmarking PUDs showed a rating score of 2 (showing blister, wrinkling, and bubble) in the early water resistance test. In contrast, the soy PUD demonstrated excellent early water resistance with a score of 4 (the highest rating).

These high performance soy PUDs can be easily applied in thin layers to a variety of substrates with very good adhesion. Soy PUD's of this invention were used to coat wood, glass, paper and concrete substrates and showed very good water resistance in all applications due to the high hydrophobicity of the soy PUD coating films. With the water beading effect, the novel soy PUDs impart easy-cleaning properties to the substrates. In addition, the coating films from the novel soy PUDs are optically transparent, making them useful in applications that require high transparency.

What is claimed is:

1. A vegetable oil modified polyurethane dispersion comprising a polyurethane prepolymer that is a reaction product of an admixture of:
   (A) from 5 to 60% by weight based on the amount by weight of all admixture monomers of at least one polyisocyanate;
   (B) from 5 to 40% by weight based upon the weight of the admixture monomers of at least one saturated monoglyceride (SMG) from a soybean oil;
   (C) at least one long-chain polymeric polyol;
   (D) from 5 to 15% by weight of the monomers in the admixture of at least one non-isocyanate based urethane polyol prepared from a polyamine and a cyclic carbonate;
   (E) optionally one polydimethylsiloxane polyol with hydroxyl functional groups; and
   (F) from 3 to 8% by weight, based on the amount by weight of all the monomers of at least one polyol with hydrophilic and/or ionic groups,
   wherein the vegetable oil modified polyurethane dispersion has an early water resistance score of 4 when dispersed in water.

2. The vegetable oil modified polyurethane dispersion of claim 1, wherein component (A) is selected from organic polyisocyanates having two or more isocyanate groups, including aliphatic, cycloaliphatic, araliphatic and aromatic polyisocyanates.

3. The vegetable oil modified polyurethane dispersion of claim 1, wherein the at least one polyisocyanate is present in the admixture in an amount ranging from 20 to 45% by weight based on the amount by weight of all admixture monomers.

4. The vegetable oil modified polyurethane dispersion of claim 1, wherein component (B) is selected from saturated monoglycerides with iodine value which is less than 3.

5. The vegetable oil modified polyurethane dispersion of claim 1, wherein the amount of the saturated monoglycerides in the urethane prepolymer is from 15 to 30% by weight based upon the weight of the admixture monomers.

6. The vegetable oil modified polyurethane dispersion of claim 1, wherein component (C) is selected from long-chain petroleum-based polymeric polyols or long chain polyols.

7. The vegetable oil modified polyurethane dispersion of claim 1, wherein component (C) includes at least two hydroxyl groups per molecule, and has a number average molar mass of from 500 g/mol to 5000 g/mol.

8. The vegetable oil modified polyurethane dispersion of claim 1, wherein the long-chain polymeric polyol is selected from the group consisting of polyether polyols, polyester polyols, polycarbonates polyols, acrylic polyols, polybutadiene polyols or mixtures thereof.

9. The vegetable oil modified polyurethane dispersion of claim 1, wherein the long-chain polymeric polyol is present in the admixture in an amount ranging from 10 to 60% by weight based upon the weight of monomers in the admixture.

10. The vegetable oil modified polyurethane dispersion of claim 1, wherein the long-chain polymeric polyol is present in the admixture in an amount ranging from 20 to 40% by weight based upon the weight of monomers in the admixture.

11. The vegetable oil modified polyurethane dispersion of claim 1, wherein the polyamine has two or more amine functional groups.

12. The vegetable oil modified polyurethane dispersion of claim 1, wherein the polyamine is selected from the group consisting of ethylene diamine, 1,3-diaminopropane, hexamethylenediamine, Jeffamine D-230, D-400, T-403, Vestamin TMD, Vestamin IPD or mixtures thereof.

13. The vegetable oil modified polyurethane dispersion of claim 1, wherein the cyclic carbonate is selected from the group consisting of ethylene carbonate, propylene carbonate, glycerine carbonate or mixtures thereof.

14. The vegetable oil modified polyurethane dispersion of claim 1, wherein component (E) is an organofunctional polydimethylsiloxane having at least two hydroxyl groups located at one chain end and alkyl groups located in the opposing chain end.

15. The vegetable oil modified polyurethane dispersion of claim 1, wherein component (E) is present in the admixture in an amount ranging from 2.5 to 5% by weight of all monomers in the admixture.

16. The vegetable oil modified polyurethane dispersion of claim 1, wherein the hydrophilic group in component (F) is selected from a non-ionic hydrophilic group, a cationic hydrophilic group an anionic hydrophilic group and mixtures thereof.

17. The vegetable oil modified polyurethane dispersion of claim 1, wherein the polyols with non-ionic characteristic are polymer polyols containing oxyethylene units.

18. The vegetable oil modified polyurethane dispersion of claim 16, wherein the cationic hydrophilic group is selected from tertiary amino groups and quaternary ammonium groups polyols and the anionic hydrophilic group is selected from sulfonate, carboxylate and phosphate groups in the form of acids or their alkali metal or ammonium salts.

19. The vegetable oil modified polyurethane dispersion of claim 1, wherein one or more neutralizing agents are added to the admixture to neutralize the ionic groups in the prepolymer to form an internal ionic emulsifier.

20. The vegetable oil modified polyurethane dispersion of claim 19, wherein the one or more neutralizing agent is present in a molar ratio with regard to the ionic groups of the prepolymer of from about 0.3:1 to 1.3:1.

21. The vegetable oil modified polyurethane dispersion of claim 19, wherein the one or more neutralizing agent is present in a molar ratio with regard to the ionic groups of the prepolymer of from about 0.5:1 to 1:1.

22. The vegetable oil modified polyurethane dispersion of claim 1, wherein the prepolymer preparation reaction is carried out at temperatures of from 50° C. to 140° C.

23. The vegetable oil modified polyurethane dispersion of claim 1, including one or more catalysts selected from the group consisting of dibutyltin dilaurate, dibutyltin sulfide, stannous octoate, lead octoate, ferric acetylacetonates, bismuth carboxylates, triethylenediamine or mixtures thereof.

24. The vegetable oil modified polyurethane dispersion of claim 23, wherein the one or more catalysts are present in the admixture in an amount ranging from 0.005 to 1% by weight, based on the weight of the reaction mixture as a whole.

25. The vegetable oil modified polyurethane dispersion of claim 1, wherein the polyurethane prepolymer has a ratio of isocyanate groups to hydroxyl groups of from 1.05 to 2.5.

26. The vegetable oil modified polyurethane dispersion of claim 25, wherein the polyurethane prepolymer is chain extended by reaction of the isocyanate groups with at least one chain extension agent having two or more isocyanate-reactive groups to form an isocyanate-terminated polyurethane prepolymer.

27. The vegetable oil modified polyurethane dispersion of claim 26, wherein the at least one chain extension agents is selected from polyols, alkanolamines, hydrazines, aminoalcohols, polyamines and mixtures thereof.

28. The vegetable oil modified polyurethane dispersion of claim 26, wherein the at least one chain extension agents is a hydrazine, a polyamine and mixtures thereof.

29. The vegetable oil modified polyurethane dispersion of claim 26, wherein the at least one chain extension agent is selected from the group consisting of ethylene diamine, diethylene triamine, triethylenetetraamine, propylene diamine, butylenes diamine, cyclohexylenediamine, ethanolamine, isopropanol amine, diethanol amine, diisopropanol amine, piperazine, 2-methyl piperazine, aminoethylethanolamine, monoethanol amine, or mixtures thereof.

30. The vegetable oil modified polyurethane dispersion of claim 26, wherein the reaction of the polyurethane prepolymer with the at least one chain extending agent is carried out before, during or after dispersing the polyurethane prepolymer in water.

31. The vegetable oil modified polyurethane dispersion of claim 26, wherein the at least one chain extending agent is present in an amount ranging from about 0.5 to about 0.95 equivalents based on available isocyanate groups in the prepolymer.

32. The vegetable oil modified polyurethane dispersion of claim 26, wherein the isocyanate-terminated prepolymer is converted into an acrylate-terminated prepolymer by reacting the isocyanate-terminated prepolymer with at least one hydroxyl functional acrylate monomer.

33. The vegetable oil modified polyurethane dispersion of claim 1, wherein the molar ratio of isocyanate groups to hydroxyl groups in the reaction components is less than 1.

34. The vegetable oil modified polyurethane dispersion of claim 1, wherein the admixture includes organic solvents that are inert toward isocyanate-polyol reactions and compatible with water.

35. The vegetable oil modified polyurethane dispersion of claim 34, wherein the organic solvent is selected from the group consisting of dimethylformamide, esters, ethers, ketoesters, ketones, methyl ethyl ketone, acetone, glycolether-esters, aliphatic and alicyclic hydrocarbon-substituted pyrrolidinones, N-methyl-2-pyrrolidinone, N-ethylpyrrolidone, hydrogenated furans, aromatic hydrocarbons, or mixtures thereof.

36. The vegetable oil modified polyurethane dispersion of claim 1, wherein ethylenically unsaturated monomers are added to the prepolymer.

\* \* \* \* \*